US009446327B2

(12) United States Patent
Lee et al.

(10) Patent No.: US 9,446,327 B2
(45) Date of Patent: Sep. 20, 2016

(54) LIQUID DISTRIBUTION DEVICE

(71) Applicant: AMTPacific Co., Ltd., Seoul (KR)

(72) Inventors: Byeong Kyeom Lee, Seoul (KR); Kwang Hyun Kim, Seoul (KR)

(73) Assignee: AMTPacific Co., Ltd., Seoul (KR)

( * ) Notice: Subject to any disclaimer, the term of this patent is extended or adjusted under 35 U.S.C. 154(b) by 0 days.

(21) Appl. No.: 14/403,183

(22) PCT Filed: Nov. 21, 2012

(86) PCT No.: PCT/KR2012/009863
§ 371 (c)(1),
(2) Date: Nov. 23, 2014

(87) PCT Pub. No.: WO2013/176357
PCT Pub. Date: Nov. 28, 2013

(65) Prior Publication Data

US 2015/0153746 A1 Jun. 4, 2015

(30) Foreign Application Priority Data

May 22, 2012 (KR) ........................ 10-2012-0054191

(51) Int. Cl.
*B01D 3/14* (2006.01)
*B01D 53/18* (2006.01)
*B01D 3/00* (2006.01)
*B67D 7/78* (2010.01)
(Continued)

(52) U.S. Cl.
CPC ............... *B01D 3/141* (2013.01); *B01D 3/008* (2013.01); *B01D 53/185* (2013.01); *B01J 4/005* (2013.01); *B01J 4/008* (2013.01); *B01J 4/02* (2013.01); *B67D 7/78* (2013.01); *G05D 11/003* (2013.01); *Y10T 137/479* (2015.04); *Y10T 137/4857* (2015.04); *Y10T 137/85938* (2015.04); *Y10T 137/86212* (2015.04); *Y10T 137/87539* (2015.04); *Y10T 137/87547* (2015.04); *Y10T 137/87877* (2015.04)

(58) Field of Classification Search
CPC ................ B01D 3/141; B01D 53/185; Y10T 137/87877; Y10T 137/4857; Y10T 137/86212; Y10T 137/87539; Y10T 137/479; Y10T 137/87547; Y10T 137/85938
See application file for complete search history.

(56) References Cited

U.S. PATENT DOCUMENTS 3,899,000 A * 8/1975 Ohlswager ............ F15D 1/0005 137/561 A
2006/0082006 A1* 4/2006 Zone ........................ B01D 3/14 261/94

(Continued)

FOREIGN PATENT DOCUMENTS

JP 04-045299 4/1992
JP 09-075602 3/1997

(Continued)

OTHER PUBLICATIONS

International Search Report and the Written Opinion Dated Mar. 4, 2013 From the Korean Intellectual Property Office Re. Application No. PCT/KR2012/009863 and Its Translation Into English.

*Primary Examiner* — Atif Chaudry

(57) ABSTRACT

The present invention is capable of precisely controlling a supply ratio of liquid and continuously supplying liquid at a constant rate by using partition plates for controlling the amount of liquid distribution.

11 Claims, 3 Drawing Sheets

110
120
121
130
122
140
152
150
154
123
161
162
160
167
170

(51) Int. Cl.
*B01J 4/00* (2006.01)
*B01J 4/02* (2006.01)
*G05D 11/00* (2006.01)

(56) References Cited

U.S. PATENT DOCUMENTS

2008/0073199 A1 3/2008 Zone et al.
2008/0251127 A1* 10/2008 Zuber ..................... B01D 3/14 137/1
2008/0271983 A1* 11/2008 Alzner .................. B01D 3/008 202/158

FOREIGN PATENT DOCUMENTS

| | | |
|---|---|---|
| JP | 11-301794 | 11/1999 |
| JP | 2011-206681 | 10/2011 |
| KR | 10-2007-0021984 | 2/2007 |
| WO | WO 2013/176357 | 11/2013 |

* cited by examiner

LIQUID DISTRIBUTION DEVICE

RELATED APPLICATIONS

This application is a National Phase of PCT Patent Application No. PCT/KR2012/009863 having International filing date of Nov. 21, 2012, which claims the benefit of priority of Korean Patent Application No. 10-2012-0054191 filed on May 22, 2012. The contents of the above applications are all incorporated by reference as if fully set forth herein in their entirety.

TECHNICAL FIELD

The present invention relates to a liquid distribution device, and more particularly to a liquid distribution device capable of precisely controlling a supply ratio of liquid and continuously supplying the liquid at a constant ratio.

BACKGROUND OF INVENTION

In general, a liquid distribution device is used in petroleum refinery, petrochemistry and fine chemistry, and is used in a scrubber, an absorber, etc., which adopt the principles of distillation, absorption and cooling so as to remove harmful gases or organic matters.

There is a column which is currently industrially used in distillation, absorption, and cooling and separates the desired material through gas-liquid contact. Recently, a divided wall column is used to save energy and reduce the investment cost. The divided wall column has a structure formed by combining two columns into one. The divided wall column is required to distribute the liquid in the upper portion thereof to lower two divided walls in a desired ratio. Here, the liquid distribution device controls the supply ratio of the liquid.

Regarding the above conventional liquid distribution device, the supply ratio of the liquid is determined according to a time during which a feeder stays for a certain time after rotating to both sides by the rotation of the axis at a predetermined angle, that is, according to a ratio of a time period during which the feeder stays in one of both sides to a time period during which the feeder stays in the other of both sides. Therefore, for a time during which the feeder rotates from one side to the other side, the liquid is not continuously supplied, so that surging occurs and the performance of packing is decreased.

Also, since compressed air consumption is increased and durability is deteriorated due to the continuous rotation of the axis, the main parts should be replaced after operation for a certain period of time. While the axis stays for a predetermined time after rotating right and left, the liquid is supplied and the distribution ratio is controlled. However, a difference occurs between the actual time ratio and the distribution ratio, and thus, it is necessary to always correct in advance the difference by the liquid flow test.

Also, in the process of distributing the liquid for the purpose of supplying the liquid, impurities included in the liquid causes errors to occur in the operation of the liquid distribution device.

SUMMARY OF THE INVENTION

Technical Problem

The present invention relates to a liquid distribution device capable of precisely controlling a supply ratio of liquid and continuously supplying the liquid at a constant ratio.

The liquid distribution device according to the embodiment of the present invention is capable of preventing the supply of the liquid from being stopped due to the impurities in the process of distributing the liquid at a constant ratio.

To achieve the above objective, the present invention provides a liquid distribution device that includes: a housing which provides a distribution space formed therein and receives liquid from an inlet pipe; a partition plate which is horizontally disposed within the housing and partitions the inner space of the housing into an upper space and a lower space, a top surface of the partition plate being divided into a first partition portion and a second partition portion which have different liquid distribution degrees; a plurality of risers which have a rectangular hexahedral shape, is disposed respectively and which are on the first partition portion and the second partition portion respectively, so as to pass through the partition plate, wherein the plurality of riser have a plurality of through-holes which is formed in sides of the plurality of risers and allows the liquid to flow into the plurality of risers and bottoms of the plurality of riser are open; a first partition wall which divides the lower space into a first chamber and a second chamber; a plurality of second partition walls which divide the second chamber into a plurality of unit chambers; a plurality of outlets which are connected to bottoms of the plurality of unit chambers to discharge the liquid in the plurality of unit chambers; and a valve which is installed on each of the plurality of outlets to control the opening and closing of the plurality of outlets.

The liquid discharge amounts of the plurality of risers may be set to be different from each other.

The amount of the liquid discharged through the plurality of risers may be set according to the number of the through-holes.

The plurality of through-holes may have the same size and may be formed at the same height.

The first partition wall and the plurality of second partition walls may be disposed perpendicular to each other.

The heights of the plurality of second partition walls may be greater than the height of the first partition wall.

The riser plurality of risers disposed on the second partition portion may be disposed directly on the plurality of unit chambers.

The number of the through-holes of the plurality of risers may be different from each other.

The plurality of outlets may include a first outlet pipe and a plurality of second outlet pipes. The first outlet pipe is connected to the first chamber in order to discharge the liquid in the first chamber to the outside. The plurality of second outlet pipes are connected to the plurality of unit chambers in order to discharge the liquid in the second chamber to the outside.

The valve may be connected to the first outlet pipe and the plurality of second outlet pipes respectively.

The liquid distribution device may further include a collecting pipe which collects the liquid discharged from the plurality of second outlet pipes.

Advantageous Effects

The liquid distribution device according to the embodiment of the present invention is capable of continuously supplying the liquid at a constant ratio and of controlling the liquid in various ratios by automatically controlling the opening and closing of the valve.

According to the liquid distribution device according to the embodiment of the present invention, since a through-hole through which the supplied liquid passes is located at a predetermined height, the impurities in the liquid are not able to passes through the through-hole, so that it is possible to prevent the supply of the liquid from being stopped due to the impurities in the process of distributing the liquid at a constant ratio.

The liquid distribution device according to the embodiment of the present invention has a simple structure and is easy to assemble. Also, the liquid distribution device has no component to be consumed and is easy to maintain and reduces the cost and time for repair.

DESCRIPTION OF SPECIFIC EMBODIMENTS OF THE INVENTION

The embodiment of the present invention will be described with reference to the accompanying drawings.

Figure 1:
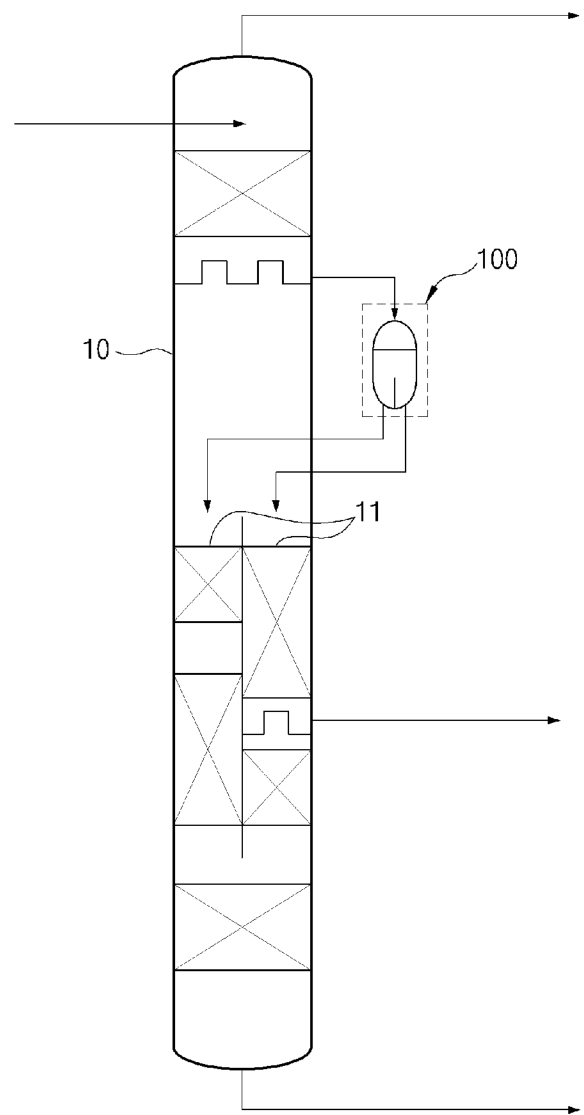
FIG. 1 is a schematic view of a divided wall column including a liquid distribution device according to the embodiment of the present invention.
Figure 2:
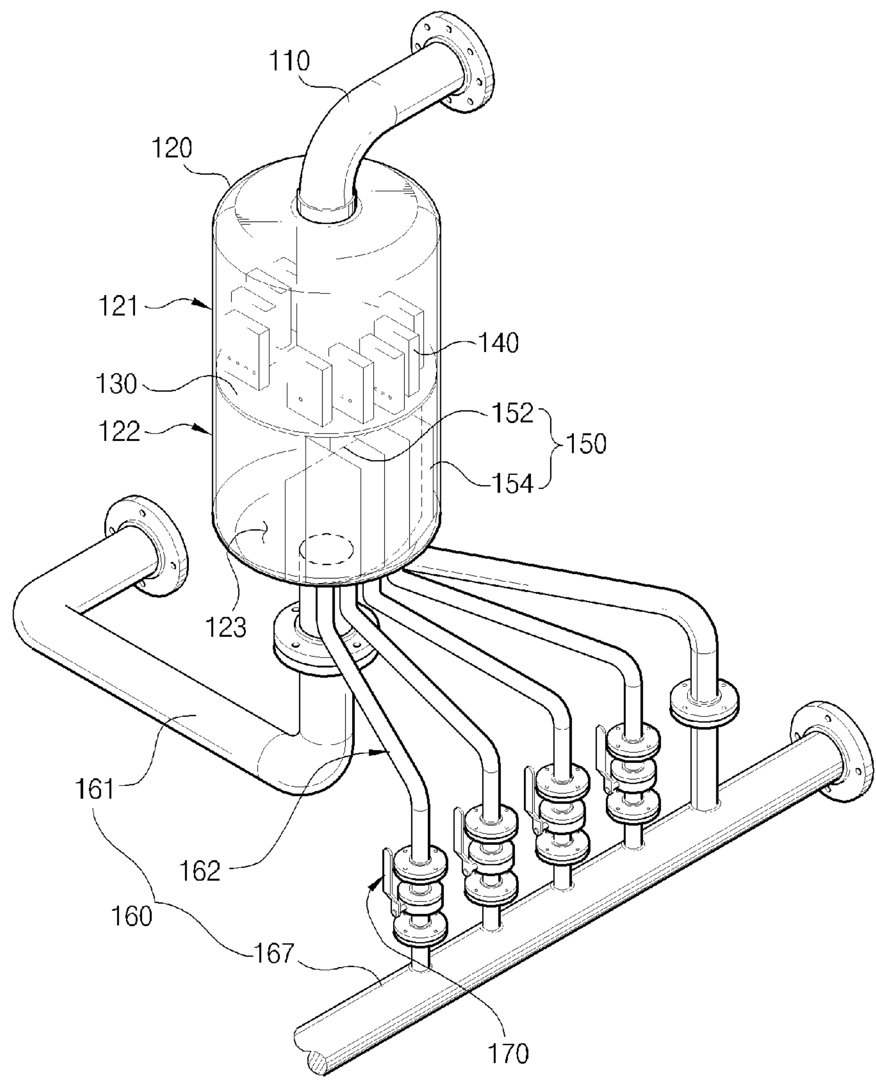
FIG. 2 is a perspective view showing the liquid distribution device shown in FIG. 1.

FIG. 1 is a schematic view of a divided wall column 10 including a liquid distribution device 100 according to the embodiment of the present invention. FIG. 2 is a perspective view showing the configuration of an example of the liquid distribution device 100 shown in FIG. 1.

Referring to FIGS. 1 and 2, the liquid distribution device 100 includes a housing 120, a partition plate 130, a plurality of risers 140, partition walls 150 including a first partition wall 152 and a plurality of second partition wall 154, a plurality of outlets 160, and a valve 170.

The housing 120 has a cylindrical shape with a predetermined size and an inner space for distributing the received liquid. An inlet pipe 110 is connected to the upper portion of the housing 120 for the purpose of supplying the liquid, i.e., distribution target. The plurality of outlets 160 are connected to the lower portion of the housing 120 for the purpose of discharging the distributed liquid.

The partition plate 130 is disposed within the housing 120.

The partition plate 130 is horizontally disposed within the housing 120 and partitions the inner space of the housing 120 into an upper space 121 and a lower space 122. Here, the upper space 121 and the lower space 122 may have the same volume and may also have different volumes according to a user's need.

Figure 3:
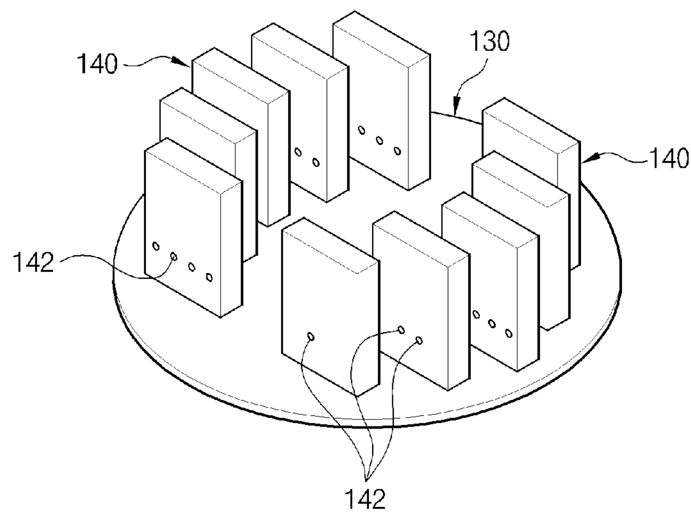
FIG. 3 is a perspective view showing an example of the arrangement of a partition plate and a plurality of risers shown in FIG. 2.
Figure 4:
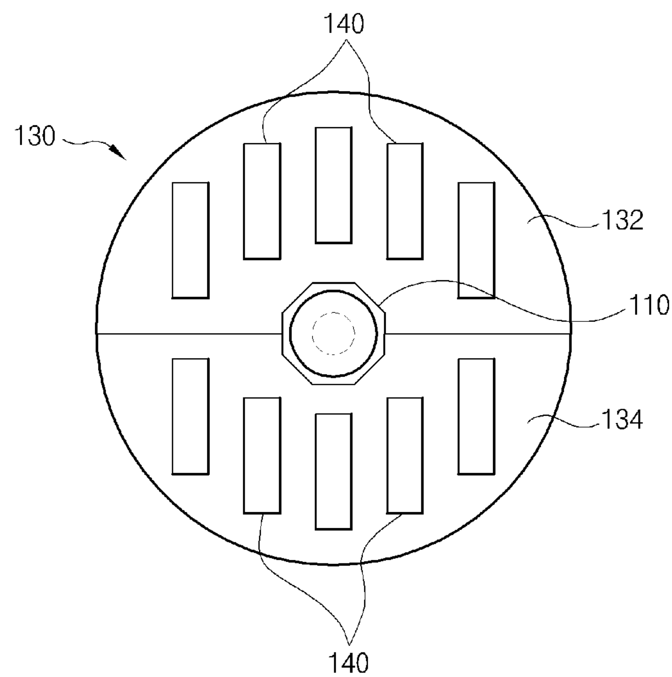
FIG. 4 is a plan view showing an example of the arrangement of the partition plate and the riser plurality of risers shown in FIGS. 2.
Figure 5:
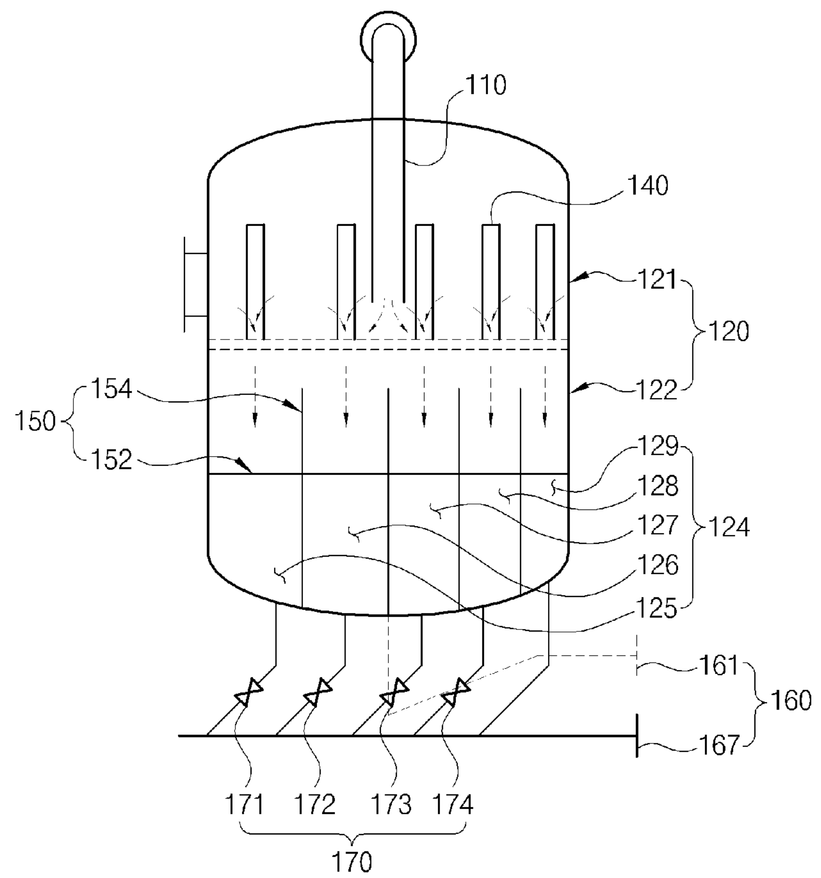
FIG. 5 is a cross-sectional side view showing the configuration of the liquid distribution device shown in FIG. 2.

FIG. 3 is a perspective view showing an example of the arrangement of the partition plate and the plurality of risers shown in FIG. 2. FIG. 4 is a plan view showing an example of the arrangement of the partition plate and the plurality of risers shown in FIG. 2. FIG. 5 is a cross-sectional side view showing the configuration of the liquid distribution device shown in FIG. 2.

Referring to FIGS. 3 to 5, a first partition portion 132 and a second partition portion 134 which have different liquid distribution degrees may be set on the top surface of the partition plate 130. The areas of the first and the second partition portions 132 and 134 may be the same as or different from each other according to the user's need. In the embodiment, it is set that the first partition portion 132 and the second partition portion 134 are disposed directly on below-described first and second chambers 123 and 124 respectively.

Here, the liquid distribution degree by the first partition portion 132 and the second partition portion 134 may be determined by the plurality of risers 140 disposed on each of the partition portions, as will be described below.

A plurality of the risers 140 are disposed on the partition plate 130.

The plurality of risers 140 have a rectangular hexahedral shape with a predetermined size and are disposed so as to pass through the partition plate 130 up and down. It is desirable that the plurality of risers 140 has a horizontal length of 30 to 50 mm, a vertical length of 50 to 250 mm and a height of 150 to 350mm. However, the sizes of the plurality of risers 140 may be variously changed according to the user's need.

The plurality of risers 140 may be disposed on the first partition portion 132 and the second partition portion 134 respectively. The number of the risers 140 to be disposed may be variously set by the user. However, it is desirable that the liquid discharge amount of the plurality of risers 140 disposed on the first partition portion 132 is greater than that of the plurality of risers 140 disposed on the second partition portion 134.

For this purpose, the plurality of risers 140 have a plurality of through-holes 142 formed in the sides of the plurality of risers 140 and allows the distribution target liquid to flow into the inside of the plurality of risers 140. Here, the plurality of through-holes 142 are formed at a predetermined height from the top surface of the partition plate 130. It is desirable that the heights of the through-holes are the same as each other and the sizes of the through-holes are the same as each other. The plurality of through- holes 142 are formed in each of the plurality of risers 140. However, the number of the through-holes may be changed for each riser according to the user's need. This will be described later.

Since the through-holes 142 are formed at a predetermined height, impurities included in the liquid supplied through the inlet pipe 110 sink on the partition plate 130. Therefore, it is possible to solve a problem that the through-holes are blocked by the impurities.

The bottoms of the plurality of risers 140 are opened and the liquid introduced through the plurality of through-holes 142 can be supplied to the lower space 122.

The first partition wall 152 is disposed in the lower space 122 of the housing 120 and divides the lower space 122 into the first chamber 123 and the second chamber 124. Here, the first partition wall 152 may be disposed on the central axis of the lower space 122 or may be disposed apart from the central axis. Therefore, the first chamber 123 and the second chamber 124 may have the same volume or different volumes. Here, the first chamber 123 may be disposed directly under the first partition portion 132, and the second chamber 124 may be disposed directly under the second partition portion 134.

The height of the first chamber 123 is intended to be less than the height of the second chamber 124. Therefore, when the liquid is fully filled with the first chamber 123 or the second chamber 124, it is desirable that the liquid moves to the adjacent chamber through the top of the first partition wall 152.

A plurality of second partition walls 154 are vertically disposed within the second chamber 124 and divide the second chamber 124 into a plurality of unit chambers 125, 126, 127, 128 and 129. Here, it is desirable that the second partition wall 154 is disposed perpendicular to the first partition wall 152 and the plurality of unit chambers 125, 126, 127, 128 and 129 are respectively disposed directly under the plurality of risers 140 disposed on the second partition portion 134. Therefore, the sizes of the unit chambers are not limited so long as the unit chamber can receive the liquid discharged from the riser disposed directly on the unit chamber. Also, in the embodiment, while the second chamber 124 includes five unit chambers 125, 126, 127, 128 and 129, the number of the unit chambers may be increased or decreased.

This will be described in more detail.

The number of the through-holes of the riser disposed directly on the unit chamber may be different from each other.

When the second chamber 124 consists of the first to the fifth unit chambers 125, 126, 127, 128 and 129, the number of the through-holes 142 may be variously set. For example, the riser disposed directly on the first unit chamber 125 has one through-hole, the riser disposed directly on the second unit chamber 126 has two through-holes, the riser disposed directly on the third unit chamber 127 has five through-holes, and the riser-disposed directly on the fourth unit chamber 128 has seven through-hole. As such, the supply amount of the liquid may be determined in proportion to the number of the through-holes of the riser.

A first outlet pipe 161 and a plurality of second outlet pipes 162, which discharge the liquid to the outside, are connected respectively to the bottoms of the first and the second chambers 123 and 124. Here, since the second chamber 124 includes the plurality of unit chambers, it is desirable that the second outlet pipe is connected to each of the plurality of unit chambers.

It is desirable that the valve 170 which controls the discharge of the liquid is connected to the first outlet pipe 161 and the plurality of second outlet pipes 162 respectively.

The valve 170 is provided to correspond to the first to the fifth unit chambers. In this ease, if the total number of the through-holes of the risers disposed on the first chamber 123, i.e., on the first partition portion 132 is 50 , the liquid may be supplied in a variety of ratios, for example, 50:1 when only the valve corresponding to the first unit chamber 125 is opened, 50:2 when only the valve corresponding to the second unit chamber 126 is opened, and 50:8 when the valves corresponding to the first to the third unit chambers 125 to 127 are opened.

It is desirable to provide a collecting pipe 167 collecting the liquid discharged from each of the plurality of second outlet pipes 162.

Hereafter, how the liquid distribution device 100 according to the embodiment of the present invention is operated will be described with reference to the accompanying drawings.

First, the liquid (reflux) which is discharged from a distillation column 10 is supplied to the upper space 121 of the housing 120 through the inlet pipe 110. The impurities that may be included in the liquid may sink on the partition plate 130 and may be separated from the supplied liquid.

Then, the supplied liquid is supplied to the lower space 122 through the through-hole 142 of the plurality of risers 140 disposed on the partition plate 130. Since the impurities have been separated from the supplied liquid, the through-holes can be prevented from being blocked by the impurities.

The liquid passed through the plurality of risers on the first partition portion 132 is supplied to the first chamber 123, and the liquid passed through the plurality of risers on the second partition portion 134 is supplied to the second chamber 124.

Here, when the liquid is fully filled with any one of the first chamber 123 and the second chamber 124, the liquid may be introduced into the other chamber through the top of the first partition wall 152.

The user is able to distribute the liquid according to his/her need. That is, the user is able to distribute and supply the required liquid by opening and closing the valve 170 connected to the each of the unit chambers according to the user's need.

The liquid supplied to the first chamber 123 is discharged to the outside of the housing 120 through the first outlet pipe 161 and is supplied again to a dividing wall 11 of the distillation column 10.

The liquid supplied to the second chamber 124 is collected to the collecting pipe 167 after passing through the plurality of second outlet pipes 162 and then is supplied to another dividing wall 11 of the distillation column 10.

It is possible to precisely control the ratio of the liquid to be supplied through the first outlet pipe 161 and the collecting pipe 167 and to easily supply the liquid.

Although the present invention has been described with reference to the embodiment shown in the drawings, this is just an example and it will be understood by those skilled in the art that various modifications and equivalent thereto may be made. Therefore, the true technical scope of the present invention should be determined by the spirit of the appended claims.

What is claimed is:

1. A liquid distribution device comprising:

a housing which provides a distribution space formed therein and receives liquid from an inlet pipe;

a partition plate which is horizontally disposed within the housing and partitions the inner space of the housing into an upper space and a lower space, wherein a top surface of the partition plate is divided into a first partition portion and a second partition portion which have different liquid distribution degrees;

a plurality of risers which have a rectangular hexahedral shape, respectively and which are disposed on the first partition portion and the second partition portion respectively, so as to pass through the partition plate, wherein the plurality of risers have a plurality of through-holes formed in sides of the plurality of risers and allows the liquid to flow into the plurality of risers and bottoms of the plurality of risers are opened;

a first partition wall which divides the lower space into a first chamber and a second chamber;

a plurality of second partition walls which divide the second chamber into a plurality of unit chambers;

a plurality of outlets which are connected to bottoms of the plurality of unit chambers to discharge the liquid in the plurality of unit chambers; and a valve which is installed on each of the plurality of outlets to control the opening and closing of the plurality of outlets.

2. The liquid distribution device of claim 1, wherein liquid discharge amounts of the plurality of risers are set to be different from each other.

3. The liquid distribution device of claim 2, wherein the amount of the liquid discharged through the plurality of risers is set according to the number of the through-holes.

4. The liquid distribution device of any one of claims 1 to 3, wherein the plurality of through-holes have the same size and are formed at the same height.

5. The liquid distribution device of claim 1, wherein the first partition wall and the plurality of second partition walls are disposed perpendicular to each other.

6. The liquid distribution device of claim 1 wherein the heights of the plurality of second partition walls are greater than the height of the first partition wall.

7. The liquid distribution device of claim 1, wherein the plurality of risers disposed on the second partition portion are disposed directly on the plurality of unit chambers.

8. The liquid distribution device of claim 7, wherein the number of the through-holes of the plurality of risers are different from each other.

9. The liquid distribution device of claim 1, wherein the plurality of outlets comprise a first outlet pipe and a plurality of second outlet pipes, wherein the first outlet pipe is connected to the first chamber in order to discharge the liquid in the first chamber to the outside, and wherein the plurality of second outlet pipes are connected to the plurality of unit chambers in order to discharge the liquid in the second chamber to the outside.

10. The liquid distribution device of claim 9, wherein the valve is connected to the first outlet pipe and the plurality of second outlet pipes respectively.

11. The liquid distribution device of claim 10, further comprising a collecting pipe which collects the liquid discharged from the plurality of second outlet pipes.

* * * * *